(12) United States Patent
Murakami

(10) Patent No.: US 11,048,233 B2
(45) Date of Patent: Jun. 29, 2021

(54) PROGRAM CORRECTION DEVICE

(71) Applicant: FANUC Corporation, Yamanashi (JP)

(72) Inventor: Hiroki Murakami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 96 days.

(21) Appl. No.: 16/590,407

(22) Filed: Oct. 2, 2019

(65) Prior Publication Data
US 2020/0133233 A1  Apr. 30, 2020

(30) Foreign Application Priority Data

Oct. 25, 2018 (JP) .............................. JP2018-200693

(51) Int. Cl.
*G05B 19/41* (2006.01)
*G05B 19/4099* (2006.01)
*G05B 19/408* (2006.01)

(52) U.S. Cl.
CPC ..... *G05B 19/4099* (2013.01); *G05B 19/4083* (2013.01); *G05B 19/41* (2013.01); *G05B 2219/34143* (2013.01); *G05B 2219/34343* (2013.01)

(58) Field of Classification Search
None
See application file for complete search history.

(56) References Cited

U.S. PATENT DOCUMENTS

| | | | |
|---|---|---|---|
| 2012/0215334 A1 | 8/2012 | Tanuma et al. | |
| 2013/0211578 A1* | 8/2013 | Tanuma | G05B 19/402 |
| | | | 700/192 |
| 2014/0172153 A1* | 6/2014 | Nishibashi | G05B 19/414 |
| | | | 700/192 |
| 2015/0234374 A1* | 8/2015 | Masumiya | G05B 19/19 |
| | | | 700/186 |
| 2016/0224005 A1* | 8/2016 | Morichi | G05B 19/40937 |
| 2018/0120808 A1* | 5/2018 | Murakami | G05B 19/4103 |
| 2018/0299859 A1* | 10/2018 | Kaneko | G05B 19/402 |
| 2019/0137975 A1* | 5/2019 | Nishiwaki | G05B 19/4103 |
| 2020/0150618 A1* | 5/2020 | Murakami | G05B 19/19 |

FOREIGN PATENT DOCUMENTS

| | | |
|---|---|---|
| JP | 2011-96077 A | 5/2011 |
| JP | 201784189 A | 5/2017 |
| JP | 2017102593 A | 6/2017 |

\* cited by examiner

*Primary Examiner* — Ryan A Jarrett

(74) *Attorney, Agent, or Firm* — Hauptman Ham, LLP

(57) ABSTRACT

A program correction device is configured to generate a plurality of machining paths obtained by smoothing each of cutting paths; select a reference path serving as a reference from among the plurality of machining paths; set a plane reference point on the reference path; calculate an intersection point between the plurality of machining paths and a plane passing through the plane reference point and being perpendicular to the reference path at the plane reference point, perform a smoothing processing based on the calculated intersection point and the plane reference point, and calculate a point on an obtained curved line as a correction command point of the plurality of machining paths; and generate a post-correction machining program obtained by inserting the correction command point in the machining program.

4 Claims, 6 Drawing Sheets

PROGRAM CORRECTION DEVICE

RELATED APPLICATIONS

The present application claims priority to Japanese Patent Application Number 2018-200693 filed Oct. 25, 2018, the disclosure of which is hereby incorporated by reference herein in its entirety.

BACKGROUND OF THE INVENTION

1. Field of the Invention

The present disclosure relates to a program correction device, and more particularly to a program correction device that edits a machining path for machining a free-form surface.

2. Description of the Related Art

When a numerical controller controls a machine tool to machine a free-form surface, as illustrated in FIG. 7, machining is performed along a reciprocating path on a surface approximating the free-form surface. When a reciprocating path illustrated in FIG. 7 is generated, first, a computer aided manufacturing (CAM) device generates a micro path along the free-form surface. The micro path includes a plurality of micro line segments and the micro line segments are continuous. Then, a smoothing processing is performed on a set of micro line segments. As a result, a reciprocating path is generated.

A level difference may occur in the micro path generated by the above-mentioned procedure. More specifically, there may be a level difference between a micro path and another micro path which is an adjacent path adjacent to the right and left of the micro path with respect to a direction of movement. This level difference is caused by an error or the like during calculation. A CAM-generated machining program shortens the length of the line segment which is the length of one command path. This is to represent a free-form surface as accurately as possible. The CAM device may generate a machining program that causes a micro level difference to occur in a command path due to calculation errors. Such a level difference between adjacent paths appears as streaks on a machined surface of a workpiece after the workpiece is machined. In other words, this level difference causes deterioration of machined surface quality.

As the technique for improving deterioration of machined surface quality due to a level difference between adjacent paths, for example, Japanese Patent Laid-Open No. 2011-096077 discloses a technique for inserting a target point as a new command point to smooth adjacent tool paths.

However, the technique disclosed in Japanese Patent Laid-Open No. 2011-096077 uniformly inserts the target point, and thus may not eliminate the level difference between adjacent paths, for example, in a large uneven portion and the like on the free-form surface.

Accordingly, it is an object of the present disclosure to provide a program correction device capable of reducing the effect of a level difference between adjacent paths occurring when a free-form surface is machined, on a machined surface.

SUMMARY OF THE INVENTION

A program correction device of the present disclosure performs a smoothing processing on a reciprocating path consisting of micro paths for machining a free-form surface among each machining path constituting the reciprocating path. This smoothing processing calculates a correction command point. Thus, a level difference between adjacent paths is reduced by machining using the correction command point. As a result, the above-mentioned problem is solved.

An aspect of the present disclosure is a program correction device that corrects a machining program for machining a free-form surface along a reciprocating path obtained by reciprocating a plurality of cutting paths commanded by a plurality of command points, the program correction device comprising: a smoothing processing unit configured to generate a plurality of machining paths obtained by smoothing each of the cutting paths; a reference path selection unit configured to select a reference path serving as a reference from among the plurality of machining paths; a plane reference point setting unit configured to set a plane reference point on the reference path; a correction command point calculation unit configured to calculate an intersection point between the plurality of machining paths and a plane passing through the plane reference point and being perpendicular to the reference path at the plane reference point, perform a smoothing processing on the plane based on the calculated intersection point and the plane reference point, and calculate a point on a curved line obtained as a result of performing the smoothing processing as a correction command point of the plurality of machining paths; and a post-correction machining program generation unit configured to generate a post-correction machining program obtained by inserting the correction command point in the machining program.

Even if there is a level difference between adjacent paths of the reciprocating path, the present disclosure reduces the level difference between adjacent paths and prevents deterioration of machined surface quality by setting an appropriate correction command point.

BRIEF DESCRIPTION OF THE DRAWINGS

The foregoing and other objects and features of the present disclosure will become apparent from the following description of embodiments with reference to the accompanying drawings in which.

DETAILED DESCRIPTION OF THE PREFERRED EMBODIMENTS

Hereinafter, an embodiment of the present disclosure will be described with reference to the drawings.

Figure 1:
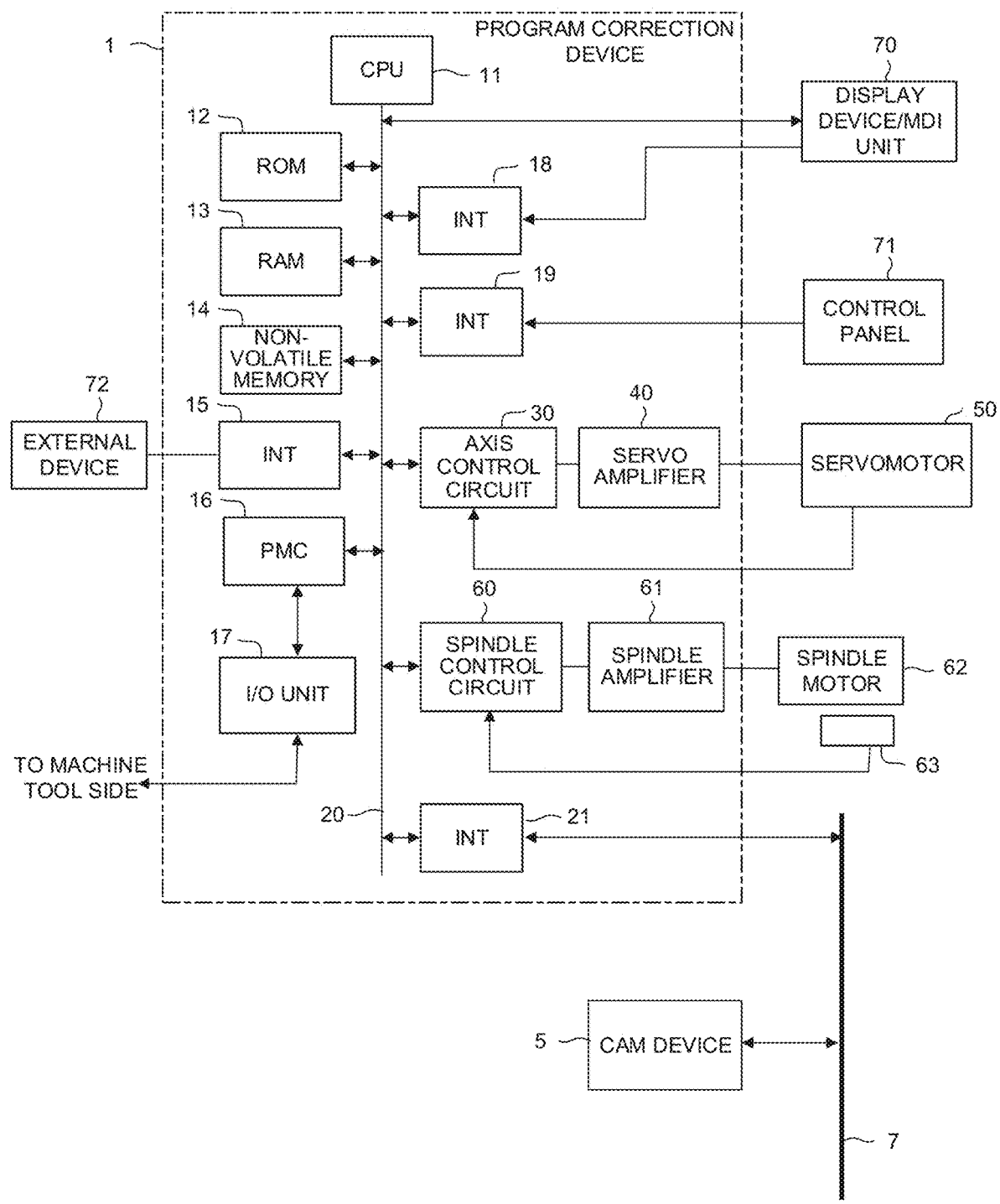
FIG. 1 is a schematic hardware configuration diagram of a program correction device according to an embodiment.

FIG. 1 is a schematic hardware configuration diagram illustrating a program correction device according to the embodiment of the present disclosure. A program correction device 1 is mounted, for example, on a numerical controller that controls a machine tool based on a machining program. The program correction device 1 may be mounted on a personal computer installed side by side with the numerical controller, or an edge computer, a cell computer, a host computer, a cloud server, and the like, connected to the numerical controller via a wired/wireless network. The present embodiment illustrates an example of the program correction device 1 mounted on the numerical controller that controls the machine tool.

A CPU (Central Processing Unit) 11 provided in the program correction device 1 according to the present embodiment is a processor that controls the entire program correction device 1. The CPU 11 reads a system program stored in a ROM (Read Only Memory) 12 via a bus 20. The CPU 11 controls the entire program correction device 1 according to the system program. A RAM (Random Access Memory) 13 temporarily stores temporary calculation data, display data, and various data input from outside, and the like.

The non-volatile memory 14 consists of, for example, a memory backed up by an unillustrated battery, an SSD (Solid State Drive), and the like. The non-volatile memory 14 maintains its memory state even when the program correction device 1 is turned off. The non-volatile memory 14 stores a machining program read from an external device 72 through an interface 15. Further, the non-volatile memory 14 stores a machining program acquired from another device such as a CAM device 5 through an interface 21. Furthermore, the non-volatile memory 14 stores a machining program and the like inputted through a display device/MDI unit 70. The machining programs and various data stored in the non-volatile memory 14 may be loaded into a RAM 13 at the time of execution/use. Further, various system programs such as a well-known analysis program are written in the ROM 12 in advance.

The interface 15 is an interface for connecting the program correction device 1 and the external device 72 such as a USB device. A control program, various parameters, and the like are read from the external device 72. In addition, the control program, various parameters, and the like edited in the program correction device 1 may be stored in an external storage device through the external device 72. A PMC (Programmable Machine Controller) 16 uses a sequence program built into the program correction device 1 to output signals to and control a machine tool and a peripheral device (for example, a tool changer, an actuator of a robot and the like, a sensor and the like attached to the machine tool) of the machine tool through the I/O unit 17. Further, the PMC 16 receives signals from various switches on the control panel provided on the main body of the machine tool, the peripheral devices, and the like, and performs a necessary signal processing and then passes the signals to the CPU 11.

The display device/MDI unit 70 is a manual data input device including a display, a keyboard, and the like. An interface 18 receives a command or data from the keyboard of the display device/MDI unit 70 and passes the command or data to the CPU 11. An interface 19 is connected to a control panel 71 having a manual pulse generator and the like for use in manually driving each axis.

An interface 21 is an interface for connecting the program correction device 1 to a wired/wireless network 7. The network 7 is connected to a CAM device 5 that provides the machining program. Further, the network 7 is connected to another control device for controlling a machine tool installed in a factory. Furthermore, the network 7 is connected to a computer such as a cell computer, an edge computer, and a host computer. These devices connected to the network 7 exchange information among them.

An axis control circuit 30 for controlling an axis provided in the machine tool receives an axis movement command amount from the CPU 11 and outputs an axis command to a servo amplifier 40. When this command is received, the servo amplifier 40 drives a servomotor 50 to move the axis provided in the machine tool. The servomotor 50 incorporates a position/speed detector. The servomotor 50 feeds back a position/speed feedback signal from this position/speed detector to the axis control circuit 30 to perform a position/speed feedback control. Note that the hardware configuration diagram of FIG. 1 illustrates only one set of the axis control circuit 30, the servo amplifier 40, and the servomotor 50, but the set of the devices is actually prepared for each axis provided in the machine tool to be controlled.

The spindle control circuit 60 receives a spindle rotation command and outputs a spindle speed signal to a spindle amplifier 61. In response to this spindle speed signal, the spindle amplifier 61 rotates a spindle motor 62 of the machine tool at the commanded rotational speed. In this manner, the spindle control circuit 60 rotates a tool. The spindle motor 62 is connected to a position coder 63. The position coder 63 outputs a feedback pulse in synchronization with the rotation of the spindle. The feedback pulse is read by the CPU 11.

Figure 2:
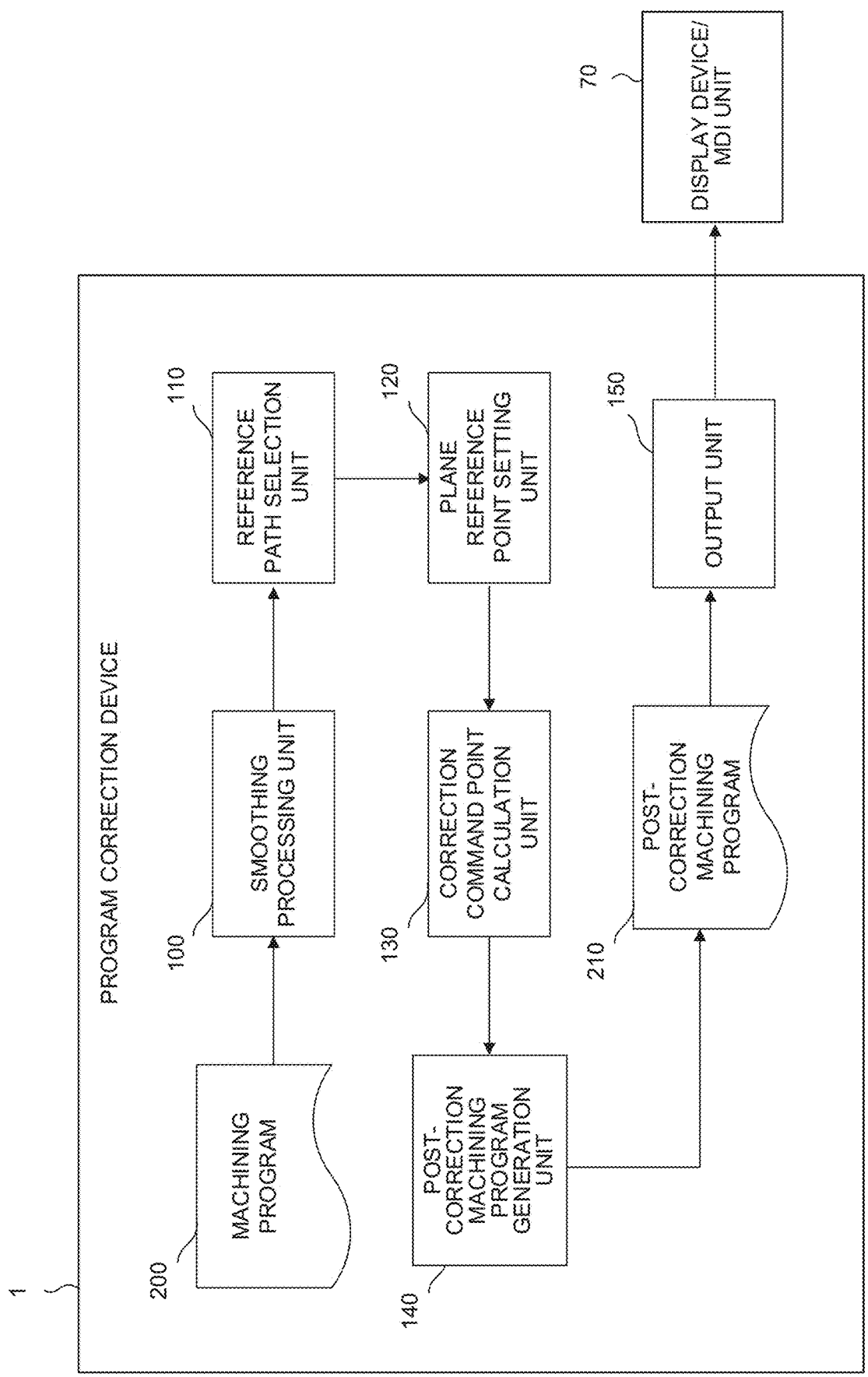
FIG. 2 is a schematic functional block diagram of the program correction device according to the embodiment.

FIG. 2 is a schematic functional block diagram of the program correction device 1 according to the embodiment of the present disclosure. Each function of the functional blocks illustrated in FIG. 2 is implemented by the CPU 11 provided in the program correction device 1 illustrated in FIG. 1 executing a system program and controlling the operation of each component of the program correction device 1.

The program correction device 1 of the present embodiment includes a smoothing processing unit 100, a reference path selection unit 110, a plane reference point setting unit 120, a correction command point calculation unit 130, a post-correction machining program generation unit 140, and an output unit 150. A machining program 200 for use in machining a free-form surface generated by the CAM device 5 or the like is stored in the non-volatile memory 14 in advance.

Figure 3:
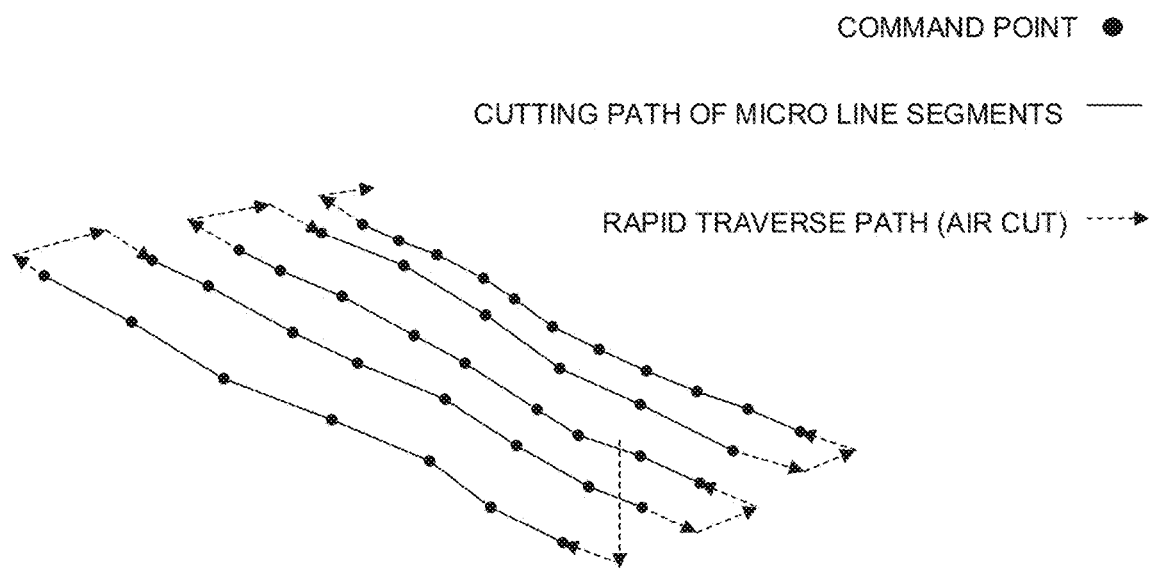
FIG. 3 is a view illustrating an example of a reciprocating path constituted by a plurality of command points.

As illustrated in FIG. 3, the machining program 200 commands a reciprocating path consisting of a rapid traverse path for moving the tool to a workpiece machining position and a cutting path. The cutting path consists of continuous micro line segments put between successive command points for machining a free-form surface on the workpiece.

Figure 4:
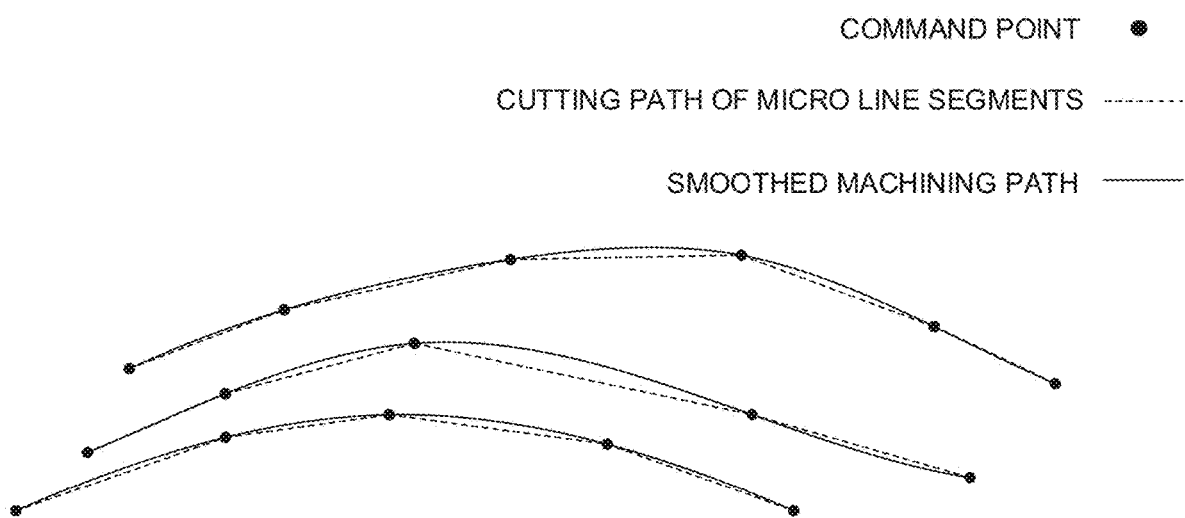
FIG. 4 is a view illustrating an example of a smoothed machining path.

The smoothing processing unit 100 is a functional means for generating a machining path obtained by smoothing the cutting path of continuous micro line segments commanded by the machining program 200. The smoothed machining path generated by the smoothing processing unit 100 is generally a smooth path of a curve line passing through a command point or near the command point. The smoothed machining path is generated by a conventional technique that has been well known, for example, by Japanese Patent Laid-Open No. 2003-337607 or the like. FIG. 4 illustrates some of the machining paths smoothed by the smoothing processing unit 100. In FIG. 4, a dotted line indicates a cutting path of micro line segments commanded by the machining program 200. The solid line indicates the machining path smoothed by the smoothing processing unit 100. As illustrated in FIG. 4, the smoothing processing unit 100 performs a smoothing processing on the cutting path of continuous micro line segments commanded by the machining program 200 (generally the cutting path of a series of continuous micro line segments put between rapid traverse paths). The reciprocating path commanded by the machining program 200 is converted to a path consisting of a plurality of rapid traverse paths and a plurality of smoothed machining paths by the smoothing processing of the smoothing processing unit 100.

The reference path selection unit 110 is a functional means that selects a reference path that is a machining path serving as a reference of the smoothing processing by the correction command point calculation unit 130 from among a plurality of smoothed machining paths (a plurality of machining paths obtained by smoothing each of the cutting paths of a series of continuous micro line segments). Alternatively, for example, the reference path selection unit 110 may select a machining path with the longest path length as the reference path from among the plurality of machining paths smoothed by the smoothing processing unit 100. Still alternatively, for example, the reference path selection unit 110 may select a machining path containing the largest number of command points as the reference path from among the plurality of machining paths smoothed by the smoothing processing unit 100.

The plane reference point setting unit 120 is a functional means that sets a plane reference point (a plurality of plane reference points) on the reference path selected by the reference path selection unit 110. The plane reference point is a point on the reference path on which the correction command point calculation unit 130 performs a smoothing processing. Alternatively, for example, the plane reference point setting unit 120 may set the command point on the reference path as the plane reference point. Still alternatively, for example, the plane reference point setting unit 120 may set the plane reference point at a predetermined interval set on the reference path.

Figure 5:
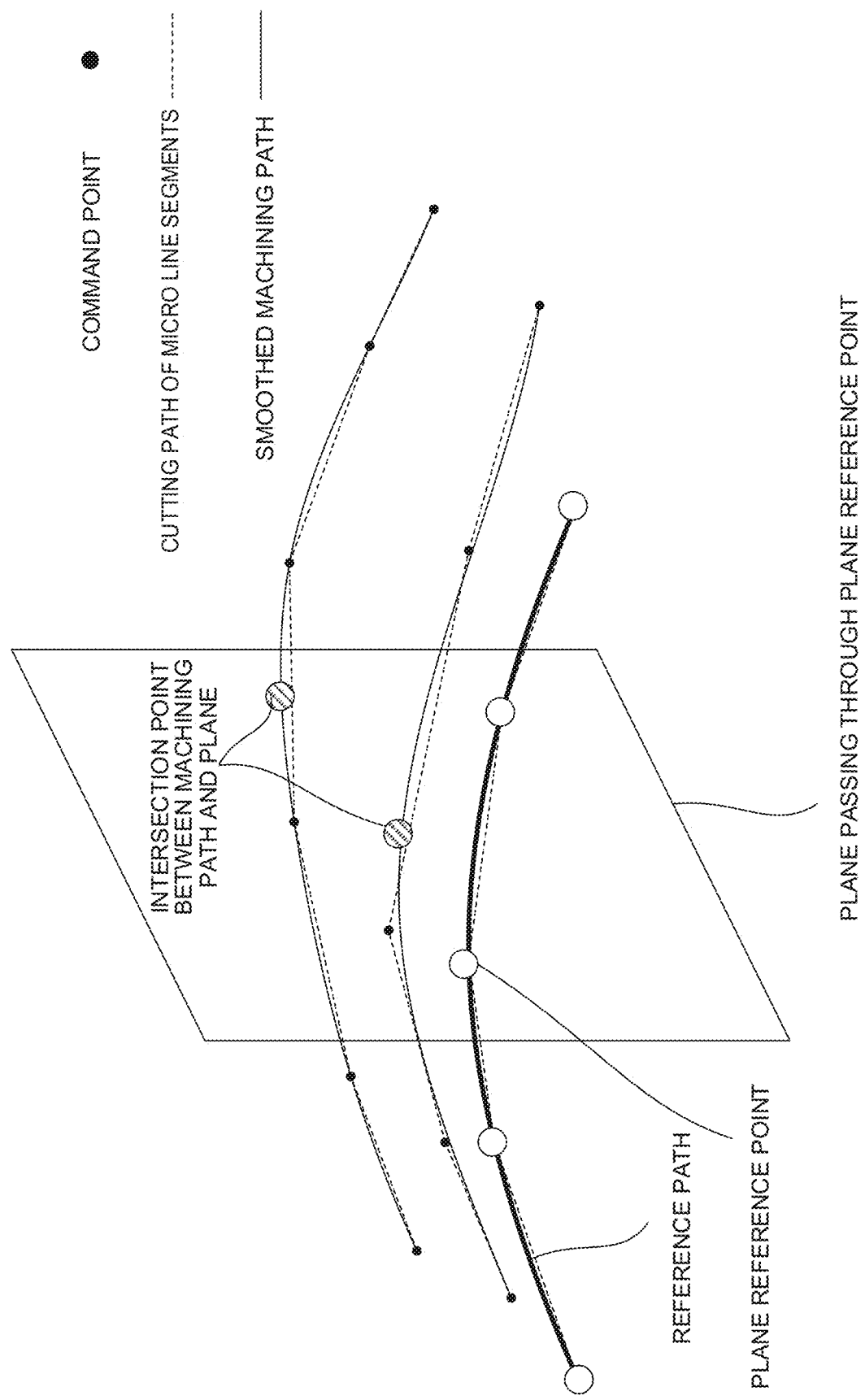
FIG. 5 is a view illustrating an example of a processing of obtaining an intersection point between a plane passing through a plane reference point and the machining path.
Figure 6:
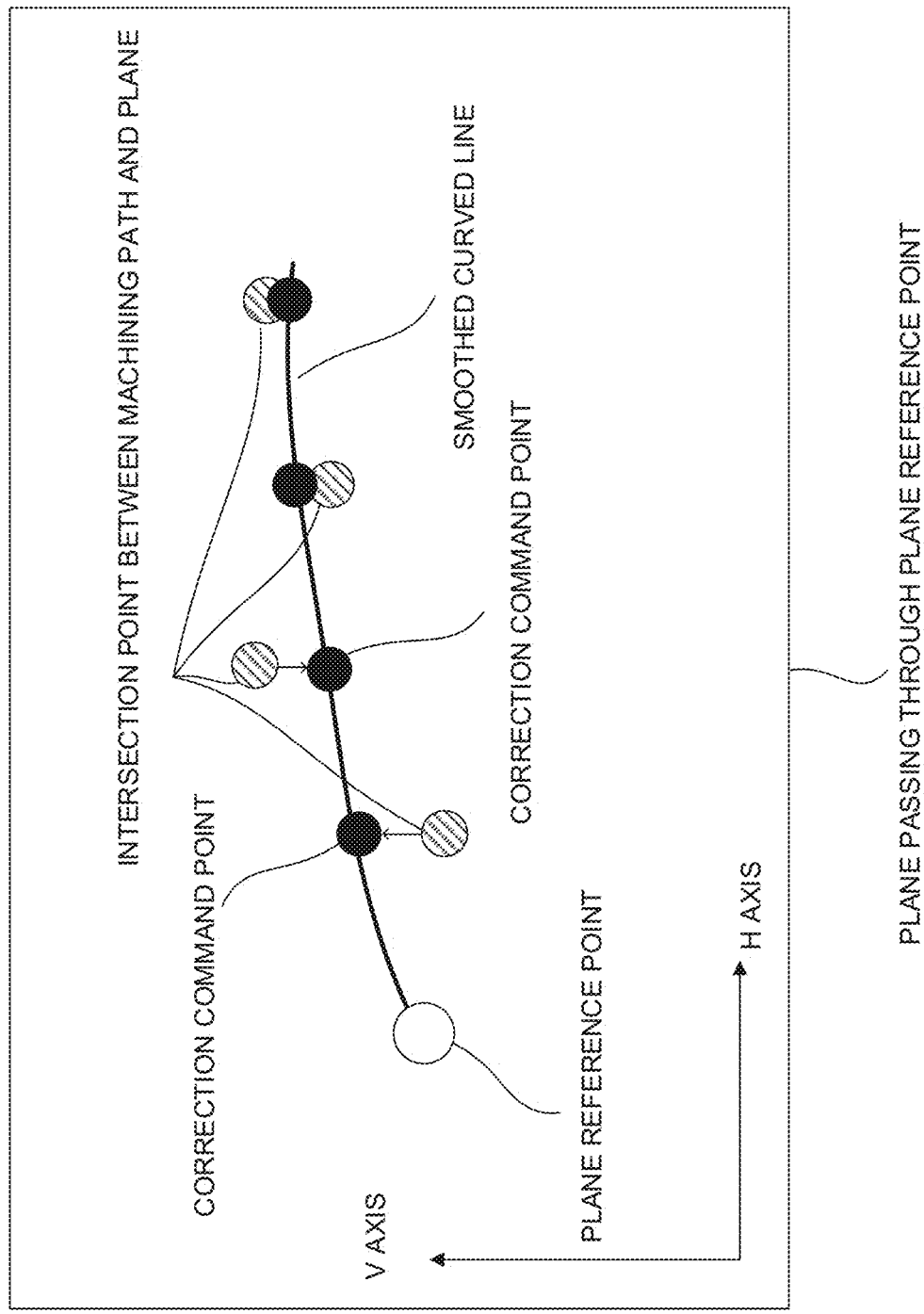
FIG. 6 is a view illustrating an example of a processing of calculating a correction command point.
Figure 7:
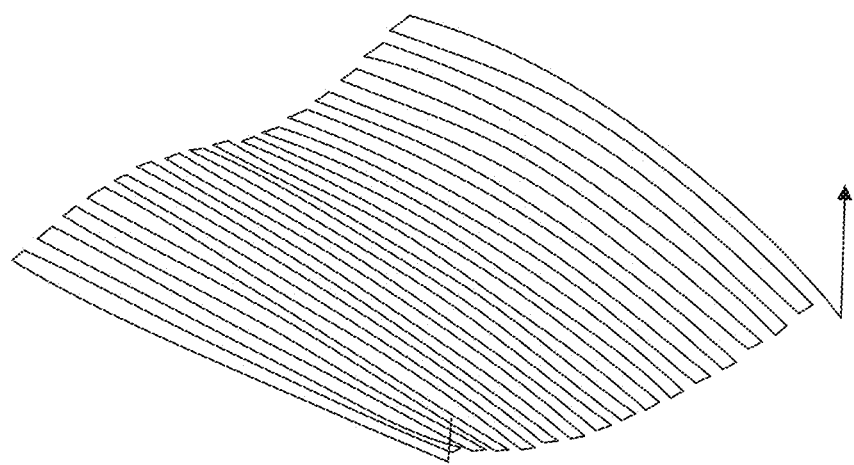
FIG. 7 is a view illustrating an example of a reciprocating path for machining a free-form surface.

The correction command point calculation unit 130 is a functional means that calculates a correction command point of each machining path by performing a smoothing processing between each machining path. As illustrated in FIG. 5, the correction command point calculation unit 130 calculates an intersection point between each machining path and a plane passing through the plane reference point set by the plane reference point setting unit 120 and being perpendicular to the reference path at a position of the plane reference point. Then, as illustrated in FIG. 6, the correction command point calculation unit 130 performs a smoothing processing on the plane passing through the plane reference point based on the calculated intersection point and the plane reference point. The correction command point calculation unit 130 calculates the point on the curved line obtained as a result of performing the smoothing processing as the correction command point of the machining path. For example, the correction command point of the machining path located at a position on the curved line obtained by smoothing may be determined as follows. The length from the distal end to the proximal end of the tool and the direction from the distal end to the proximal end of the tool during machining of the position on each path are defined as a vector T. A component of the vector T parallel to the plane passing through the plane reference point is defined as Tp. An intersection point between a straight line drawn from the intersection point between the machining path and the plane along vector component Tp with respect to a curved line obtained by smoothing and the curved line is calculated as the correction command point of the machining path. The correction command point calculation unit 130 performs the above-mentioned processing based on each plane reference point.

If there is a difference between machining path intersection point groups on planes adjacent to each other, a level difference in the machining direction will occur. Thus, as the smoothing processing performed by the correction command point calculation unit 130, it is preferable to use a smoothing processing using a filter that is generally said to be less likely to cause a level difference.

The post-correction machining program generation unit 140 is a functional means that generates a post-correction machining program 210 by inserting the correction command point calculated by the correction command point calculation unit 130 into the machining program 200, and stores the post-correction machining program 210 in the non-volatile memory 14. The post-correction machining program 210 is used as it is to control the machine tool. The post-correction machining program 210 is displayed on the display device/MDI unit 70 by the output unit 150. Thus, the post-correction machining program 210 is used by the operator to confirm the machining path after correction. Note that the post-correction machining program 210 may be output to and used by another control device, a computer, and the like via a network or an external storage device. Note also that when the machine tool is controlled based on the post-correction machining program 210 generated by the post-correction machining program generation unit 140, a smoothing processing containing the correction command point may be further performed based on a normal control processing.

As a modification of the present embodiment, if there is a command point that does not need to be corrected (must not be corrected) (for example, if the command point is a boundary between surfaces such as a ridge or valley part), the correction command point calculation unit 130 may perform a smoothing processing of adjusting the correction amount of surrounding points so as not to move the position of the command point that does not need the correction. For example, the operator may set the command point that does not need to be corrected in advance. Alternatively, the machining program 200 may be analyzed to find a point where the curvature of a path changes more than a certain amount before and after the command point and to automatically set the point as the command point that does not need to be corrected.

Hereinbefore, one embodiment of the present disclosure has been described, but the present disclosure is not limited only to the above described embodiment and can be implemented in various forms by adding appropriate modifications.

The invention claimed is:

1. A program correction device that corrects a machining program for machining a free-form surface along a reciprocating path obtained by reciprocating a plurality of cutting paths commanded by a plurality of command points, the program correction device comprising:
   a smoothing processing unit that generates a plurality of machining paths obtained by smoothing each of the cutting paths;
   a reference path selection unit that selects a reference path serving as a reference from among the plurality of machining paths;
   a plane reference point setting unit that sets a plane reference point on the reference path;
   a correction command point calculation unit that calculates an intersection point between the plurality of machining paths and a plane passing through the plane reference point and being perpendicular to the reference path at the plane reference point, performs a smoothing processing on the plane based on the calculated intersection point and the plane reference point, and calculates a point on a curved line obtained as a result of performing the smoothing processing as a correction command point of the plurality of machining paths; and a post-correction machining program generation unit that generates a post-correction machining program obtained by inserting the correction command point in the machining program.

2. The program correction device according to claim 1, wherein
the plane reference point setting unit sets a plurality of plane reference points on the reference path, and the correction command point calculation unit calculates the correction command point based on each of the plurality of plane reference points.

3. The program correction device according to claim 1, wherein
the plane reference point setting unit sets a command point on the reference path as the plane reference point.

4. The program correction device according to claim 1, wherein
the plane reference point setting unit sets the plane reference point at a regular interval on the reference path.

* * * * *